Aug. 14, 1962  J. A. KLAVON, JR  3,049,192
AUTOMATIC BRAKE ADJUSTER
Filed July 13, 1959  2 Sheets-Sheet 2
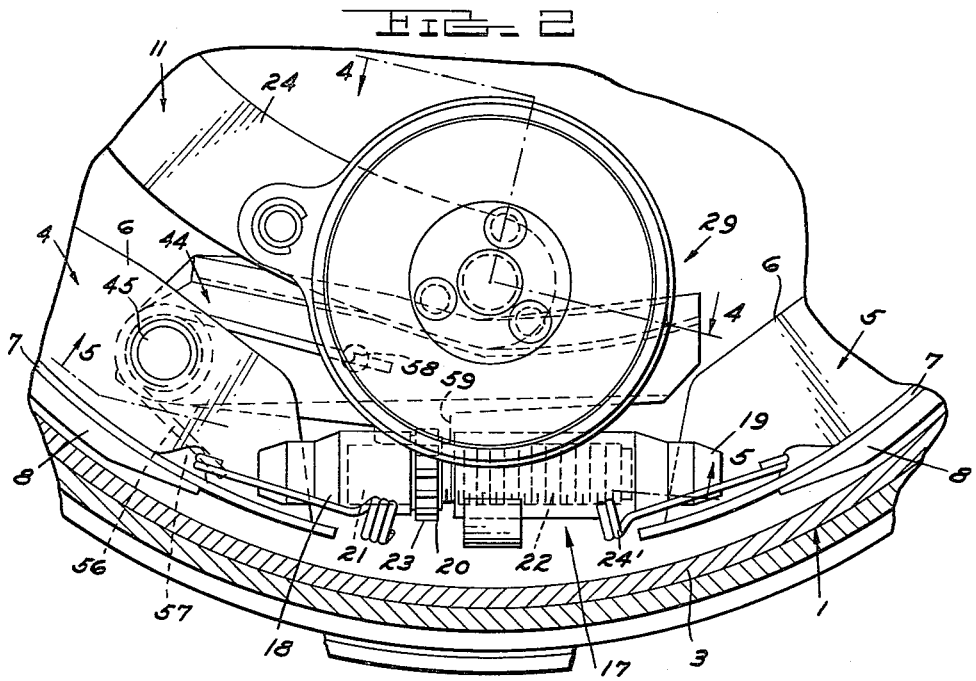
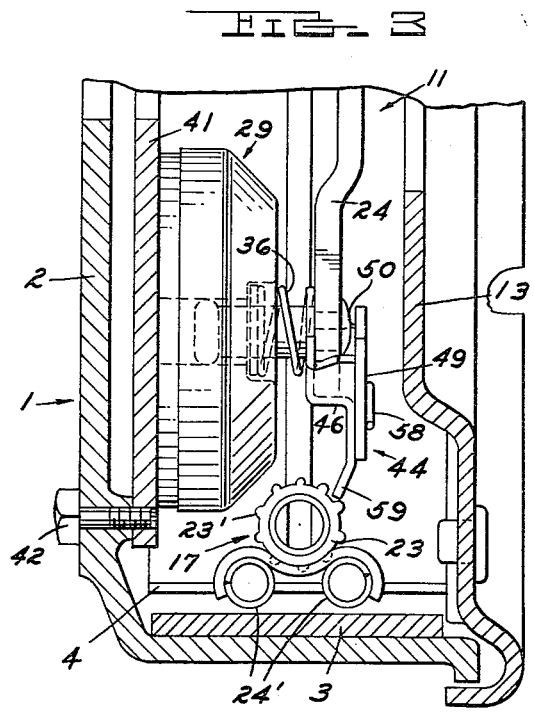
INVENTOR.
JOSEPH A. KLAVON JR.
BY
Whittemore, Hulbert & Belknap
ATTORNEYS

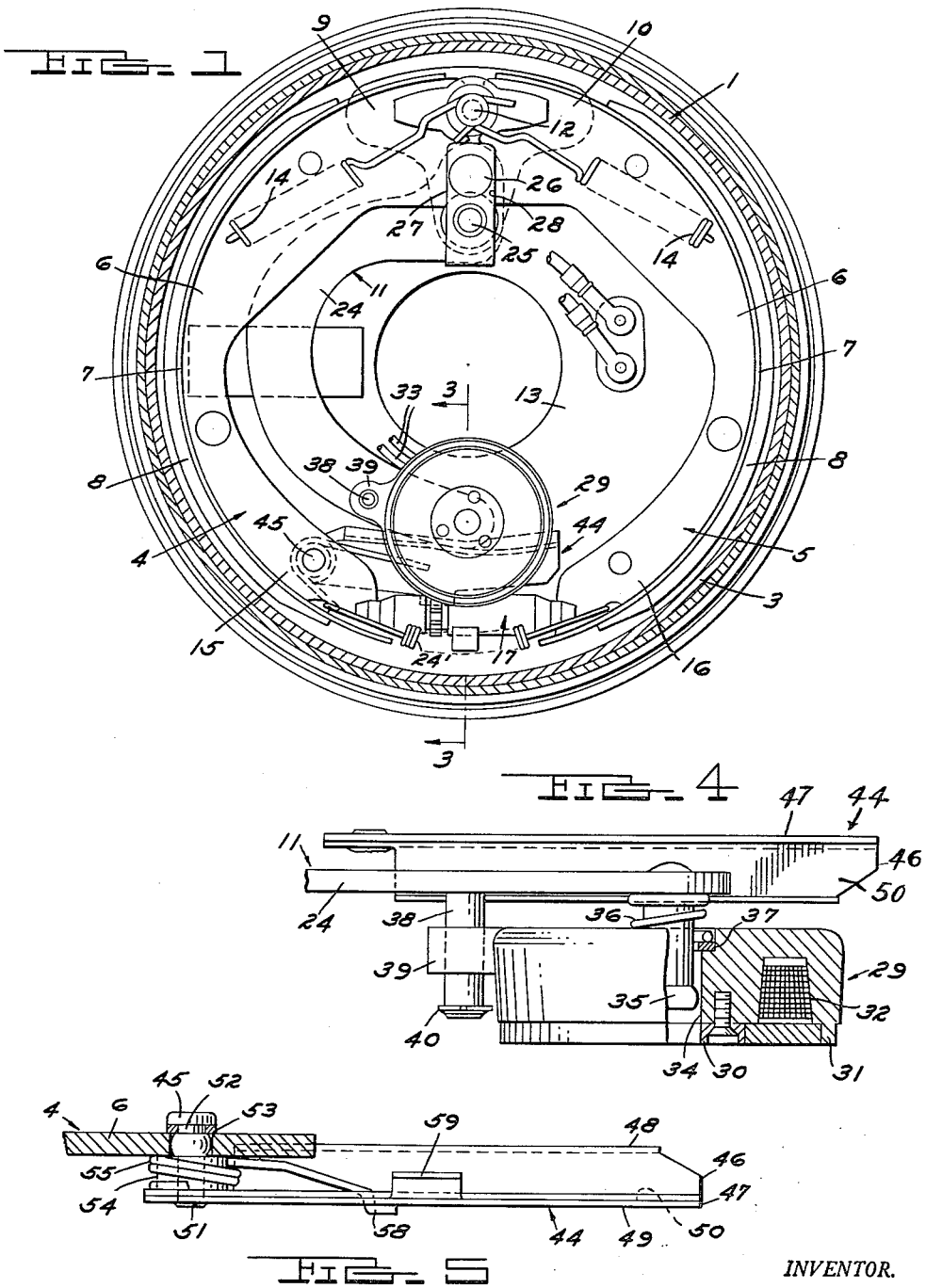

United States Patent Office 3,049,192
Patented Aug. 14, 1962

3,049,192
AUTOMATIC BRAKE ADJUSTER
Joseph A. Klavon, Jr., Jackson, Mich., assignor to Kelsey-Hayes Company, Detroit, Mich., a corporation of Delaware
Filed July 13, 1959, Ser. No. 826,554
10 Claims. (Cl. 188—79.5)

This invention relates to automatic brake adjusters and refers more particularly to automatic adjusters for electro-magnetically operated brakes.

The invention has for one of its objects to provide an adjuster for a brake adapted to be applied by an electro-magnetically controlled operator, which adjuster is automatically actuated by the brake operator to compensate for lining wear.

The invention has for another object to provide an adjuster for a brake having a drum, a pair of brake shoes within the drum having adjacent ends spaced by a connecting device, an electro-magnetically controlled operator for spreading the shoes apart to apply the brake, and an adjuster actuated by the operator for extending the connecting device to compensate for lining wear.

The invention has for a further object to provide a brake adjuster which is automatically operated during reverse braking only.

Other objects and features of the invention will become apparent as the description proceeds, especially when taken in conjunction with the accompanying drawings, illustrating a preferred embodiment of the invention, wherein:

FIG. 1 is a side elevation partly in section of a brake embodying the invention.

FIG. 2 is an enlarged fragmentary view of a portion of FIG. 1.

FIG. 3 is a sectional view on the line 3—3 of FIG. 1.
FIG. 4 is a sectional view on the line 4—4 of FIG. 2.
FIG. 5 is a sectional view on the line 5—5 of FIG. 2.

The brake is a vehicle wheel brake, particularly adapted for trailer use, of the type having a brake drum which is secured to and revolvable with a ground-engaging wheel of the vehicle and also having a friction device within and engageable with the annular flange of the drum. The drum 1 has a web 2 and an annular peripheral brake flange 3. The friction device comprises a pair of shoes 4 and 5 which are alike, each shoe being of T cross-section and having the radial web 6, the arcuate flange or rim 7 and the brake lining 8 secured to the arcuate flange or rim and engageable with the brake flange 3.

The shoes have the separable ends 9 and 10 adapted to be spread apart to move the shoes into engagement with the brake flange by an electro-magnetically controlled operator 11. An anchor pin 12 is mounted on the backing plate 13. Return springs 14 are connected to the anchor pin and to the web of each shoe to normally hold the shoes in the retracted position shown in which the linings 8 are out of engagement with and spaced from the brake flange. In the normal retracted position of the brake shoes, the separable ends 9 and 10 engage the anchor pin. Depending on the direction of drum rotation, one or the other of the shoe ends 9 and 10 anchor on pin 12 during an application of the brake.

The shoes have the other adjacent ends 15 and 16, and a connecting device 17 extends between ends 15 and 16. The connecting device determines the clearance between the brake shoe linings 8 and the drum flange 3 in the unapplied position of the parts illustrated, and is adjustable to compensate for lining wear. The adjustable connecting device 17 comprises the axially aligned members 18 and 19 and the rotatable member 20. The members 18 and 19 have bifurcated ends embracing and abutting recessed portions in the ends of the webs 6. The rotatable member 20 has a cylindrical pin 21 journalled in the cylindrical socket of member 18, a shank 22 extending into and threadedly engaging the socket of member 19 and an integral ratchet wheel 23 abutting member 18. The wheel 23 has spaced teeth 23' about its periphery. Springs 24' extend between and are secured at their ends to the webs 6 of the shoes, and the coiled portions of the springs engage the teeth 23' of wheel 23 to maintain the adjustment of the connecting device.

The operator 11 comprises an arm 24 which is pivoted at one end to the backing plate 13 by a pin 25. At its pivoted end, the operator arm 24 has a rigid extension carrying a roller 26 between the opposed flats 27 and 28 on the webs at the ends 9 and 10 of the shoes. The free end of the operator arm carries an electro-magnet 29 having an inner pole piece 30 and an outer pole piece 31. A coil 32 located within the electro-magnet is energized by a suitable source of current through leads 33. The electro-magnet has a central passage 34 slidably receiving a pin 35 secured to the free end of the operator arm. A coil spring 36 encircles the pin and is compressed between the free end of the operator arm and an annular disc 37 at the bottom of a counterbore formed in the central passage 34. A second pin 38 parallel to pin 35 is slidably received in a passage in an extension 39 of the electro-magnet, and a snap clip 40 on the end of the pin retains the electro-magnet against accidental removal. An armature plate 41 within the drum is secured to the web 2 by fasteners, one of which is indicated at 42. The spring 36 normally holds the poles of the electro-magnet in light pressure contact with the armature between brake applications.

When the drum is rotating, the friction generated between the armature and electro-magnet due to the light pressure contact thereof is not enough to rotate the operator arm 24. However, when the coil of the electro-magnet is energized, the poles thereof are attracted to the armature with greater force and the friction between the armature and electro-magnet is sufficient to cause the operator arm to pivot in one direction or the other, depending upon the direction of drum rotation. The force of attraction between the poles of the electro-magnet and the armature is dependent upon the strength of the current supplied to the coil. Therefore, the extent of angular movement of the operator arm and hence the degree of braking can be varied by varying the current. When the operator arm 24 is pivoted in either direction, the roller armature 26 engages one or the other of the flats 27 and 28 to spread apart the ends 9 and 10 of the shoes until their linings 8 engage the flange of the drum to apply the brake.

An automatic adjuster 44 is pivoted to the end 15 of shoe 4 by a pin 45. The adjuster is formed of a pair of plates 46 and 47 secured together in surface-to-surface contact and having along their corresponding longitudinal edges the angle shaped flanges 48 and 49 which cooperate to define a channel 50. The flange portion 49 is actually in the same plane as the rest of plate 47. At one end the plates 46 and 47 are provided with aligned apertures for receiving the reduced extension 51 of pin 45. The pin 45 has a reduced neck 52 encircled by a retainer 53 and a spacer 54 between the shoe web and adjuster. A coil spring 55 encircles the spacer and has one end 56 secured to the web of shoe 4 and the other end 58 engaged in an aperture of the adjuster. The spring is held under tension and urges the adjuster in a counterclockwise direction about its pivot for engagement with the free end of the operator arm. It will be noted in FIG. 3 that the operator arm engages within the channel 50 of the adjuster.

The spring also urges the adjuster axially into yielding contact with the connecting device 17 and the adjuster has an integral pawl 59 engageable with the toothed wheel 23 of the connecting device 17. As seen in FIG. 3, the pawl is turned in relative to the wheel to engage the periphery thereof. During forward movement of the vehicle, the wheel and brake drum rotate counterclockwise (FIG. 1). During this time, if the electro-magnet is energized to apply the brake, the operator arm 24 turns in a counter-clockwise direction to spread the shoes apart and apply the brake, and the free end of the arm 24 moves away from the adjuster permitting the adjuster to rise slightly from the neutral position shown. When the electro-magnet is de-energized to release the brake, return springs 14 cause the shoes and operator arm to again assume the illustrated position and the operator arm returns to its neutral position. On reverse rotation of the brake drum, the operator arm moves in a clockwise direction, during which time its free end moves toward the adjuster tending to move it downwardly. Normally this downward movement of the adjuster will not be sufficient to engage a tooth and rotate the wheel 23 where there is normal clearance between the shoe linings and the drum. However, when the clearance becomes excessive due to lining wear, the operator arm moves through a greater arc to apply the brake. On reverse braking, this effects sufficient downward movement of the adjuster pawl to engage a tooth on the wheel and rotate it in a clockwise direction, as viewed in FIG. 3, to slightly extend the connecting device 17 and take up clearance. The adjustment will continue upon each reverse application of the brakes until a normal minimum clearance is again established.

Such adjustment for wear normally will not take place upon forward braking because during this time the operator arm moves counter-clockwise and away from the adjuster. Hence the adjuster moves up and then simply returns to its normal or neutral position. After an adjustment equivalent to approximately the angular distance between two adjacent teeth on the wheel 23, the pawl will snap over the next tooth in the series. This might take place upon on application of the brakes during forward rotation of the drum so that there would be a slight adjustment of the connecting device 17 when the brake is released and the pawl moves down to its normal position. However, such adjustment is negligible and further adjustment will take place only on reverse braking. It is desirable that the automatic adjustment for wear takes place on reverse braking when the drum is not likely to be expanded by overheating, rather than forward braking.

What I claim as my invention is:

1. A brake comprising a brake drum, a pair of shoes within and engageable with said drum and having adjacent ends, a longitudinally adjustable device connecting said adjacent ends of said shoes, said device including a peripherally notched wheel rotatable in one direction to elongate said device and thereby adjust said shoes to compensate for wear, means for applying the brake including a pivoted arm having means for spreading said shoes into engagement with said drum upon pivotal movement of said arm in either direction, means for pivoting said arm in one direction during forward rotation of said drum and in the opposite direction during reverse rotation thereof including an armature carried by said drum and an electro-magnet carried by said arm in position to contact said armature, and an adjuster pivoted on one of said shoes and having a part engageable with the periphery of said wheel and swingable in an operating direction to rotate said wheel in said one direction to elongate said device, said arm having a part engageable with said adjuster to swing it in said operating direction upon pivotal movement of said arm in said opposite direction only.

2. A brake comprising a brake drum, a pair of shoes within and engageable with said drum and having adjacent ends, a longitudinally adjustable device connecting said adjacent ends of said shoes, said device including a peripherally notched wheel rotatable in one direction to elongate said device and thereby adjust said shoes to compensate for wear, means for applying the brake including a pivoted arm having means for spreading said shoes into engagement with said drum upon pivotal movement of said arm in either direction, means for pivoting said arm in one direction during forward rotation of said drum and in the opposite direction during reverse rotation thereof including an armature carried by said drum and an electro-magnet carried by said arm in position to contact said armature, an adjuster pivoted on one of said shoes and having a part engageable with the periphery of said wheel and swingable in an operating direction to rotate said wheel in said one direction to elongate said device, said adjuster having a portion defining a channel and said arm having a part received in said channel to swing said adjuster in said operating direction upon pivotal movement of said arm in said opposite direction only, and spring means for retaining said adjuster in yielding engagement with said part of said arm and said wheel.

3. A brake comprising a brake drum, a pair of shoes within and engageable with said drum and having adjacent ends, a longitudinally adjustable device connecting said adjacent ends of said shoes, said device including a peripherally notched wheel rotatable in one direction to elongate said device and thereby adjust said shoes to compensate for wear, means for applying the brake including a pivoted arm having means for spreading said shoes into engagement with said drum upon pivotal movement of said arm in either direction, means for pivoting said arm including an armature carried by said drum and an electro-magnet carried by said arm in position to engage said armature, the direction of pivotal movement of said arm being dependent upon the direction of drum rotation and an adjuster pivoted on one of said shoes and having a part engageable with the periphery of said wheel and swingable in an operating direction to rotate said wheel in said one direction to elongate said device, said arm having a part engageable with said adjuster to swing it in said operating direction upon predetermined pivotal movement of said arm in one direction only.

4. An electro-magnetically actuated brake comprising a brake drum, a pair of shoes within and engageable with said drum and having adjacent ends, a longitudinally adjustable device connecting said adjacent ends of said shoes, said device including a peripherally notched wheel rotatable in one direction to elongate said device and thereby adjust said shoes to compensate for wear, electro-magnetic means for applying the brake including a movable member located entirely within the interior of the drum, said member having means for spreading said shoes into engagement with said drum upon movement of said member, and an adjuster carried by one of said shoes and having a part engageable with the periphery of said wheel to rotate said wheel in said one direction when operated, said adjuster being positioned to be engaged and operated by said movable member upon movement as aforesaid of said member.

5. An electro-magnetically actuated brake comprising a brake drum, a pair of shoes within and engageable with said drum and having adjacent ends, a longitudinally adjustable device connecting said adjacent ends of said shoes, said device including a peripherally notched wheel rotatable in one direction to elongate said device and thereby adjust said shoes to compensate for wear, electro-magnetic means for applying the brake including a pivoted arm located entirely within the interior of said drum, said arm having means for spreading said shoes into engagement with said drum upon pivotal movement of said arm, and an adjuster pivoted on one of said shoes and having a part engageable with the periphery of said wheel and swingable in an operating direction to rotate said wheel in said one direction to elongate said device, said arm having a part directly engageable with said adjuster to swing it in said operating direction upon predetermined pivotal movement of said arm.

6. A brake comprising a brake drum, shoes within and engageable with said brake drum and having adjacent ends, a longitudinally adjustable device connecting said adjacent ends of said shoes, means for applying the brake including a movable member having means for spreading said shoes into engagement with said drum upon movement of said member in either one direction or in the opposite direction, means for moving said member in said one direction during forward rotation of said drum and in said opposite direction during reverse rotation thereof, an adjuster carried by one of said shoes and having a part engageable with said device and effective to longitudinally adjust said device when said adjuster is moved in an operating direction, said movable member having a portion adjacent said adjuster movable toward and engageable with said adjuster upon movement of said member in said opposite direction to move said adjuster in said operating direction but movable away from said adjuster upon movement of said member in said one direction.

7. A brake comprising a brake drum, shoes within and engageable with said drum and having adjacent ends, a longitudinally adjustable device connecting said adjacent ends of said shoes, said device including an element rotatable in one direction to elongate said device and thereby adjust said shoes to compensate for wear, means for applying the brake including a movable member having means for spreading said shoes into engagement with said drum upon movement of said member either in one direction or in the opposite direction, means for moving said member in said one direction during forward rotation of said drum and in said opposite direction during reverse rotation thereof including an armature carried by said drum and an electro-magnet carried by said movable member in position to engage said armature, an adjuster operatively connected to one of said shoes and having a part engageable with said element to rotate the latter in said one direction when said adjuster is moved in an operating direction, said movable member having a portion adjacent said adjuster movable toward and engageable with said adjuster upon movement of said member in said opposite direction to move said adjuster in said operating direction but movable away from said adjuster upon movement of said member in said one direction.

8. A brake comprising a brake drum, shoes within and engageable with said drum and having adjacent ends, a longitudinally adjustable device connecting said adjacent ends of said shoes, said device including an element rotatable in one direction to elongate said device and thereby adjust said shoes to compensate for wear, means for applying the brake including a movable member having means for spreading said shoes into engagement with said drum upon movement of said member either in one direction or in the opposite direction, means for moving said member in said one direction during forward rotation of said drum and in said opposite direction during reverse rotation thereof including an armature carried by said drum and an electro-magnet carried by said movable member in position to engage said armature, an adjuster operatively connected to one of said shoes and having a part engageable with said element to rotate the latter in said one direction when said adjuster is moved in an operating direction, said movable member having a portion adjacent said adjuster movable toward and engageable with said adjuster upon movement of said member in said opposite direction to move said adjuster in said operating direction but movable away from said adjuster upon movement of said member in said one direction, and resilient means for retaining said adjuster in yielding engagement with said portion of said member and said element.

9. An electro-magnetically actuated brake comprising a brake drum, shoes within and engageable with said brake drum and having adjacent ends, a longitudinally adjustable device connecting said adjacent ends of said shoes, electro-magnetic means for applying the brake including a movable member having means for spreading said shoes into engagement with said drum upon movement of said member in either one direction or in the opposite direction, means for moving said member in said one direction during forward rotation of said drum and in said opposite direction during reverse rotation thereof, an adjuster carried by one of said shoes and having a part engageable with said device and effective to longitudinally adjust said device when said adjuster is moved in an operating direction, said movable member having a portion adjacent said adjuster movable toward and engageable with said adjuster upon movement of said member in said opposite direction to move said adjuster in said operating direction but movable away from said adjuster upon movement of said member in said one direction.

10. A brake comprising a brake drum, a pair of shoes within and engageable with said drum and having adjacent ends, a longitudinally adjustable device connecting said adjacent ends of said shoes, said device including a peripherally notched wheel rotatable in one direction to elongate said device and thereby adjust said shoes to compensate for wear, means for applying the brake including a pivoted arm having means for spreading said shoes into engagement with said drum upon pivotal movement of said arm in either direction, means for pivoting said arm in one direction during forward rotation of said drum and in the opposite direction during reverse rotation thereof, an adjuster pivoted on one of said shoes and having a part engageable with the periphery of said wheel and swingable in an operating direction to rotate said wheel in said one direction to elongate said device, said adjuster having a portion defining a channel and said arm having a part received in said channel to swing said adjuster in said operating direction upon pivotal movement of said arm in said opposite direction only, and spring means for retaining said adjuster in yielding engagement with said part of said arm and said wheel.

References Cited in the file of this patent

UNITED STATES PATENTS

| | | |
|---|---|---|
| 1,874,821 | Smith | Aug. 30, 1932 |
| 2,144,086 | Rowland et al. | Jan. 17, 1939 |
| 2,265,999 | Cadman | Dec. 16, 1941 |
| 2,301,272 | Goepfrich | Nov. 10, 1942 |
| 2,365,726 | Penrose | Dec. 26, 1944 |
| 2,670,059 | Link | Feb. 23, 1954 |
| 2,762,463 | Brooks | Sept. 11, 1956 |
| 2,897,921 | Burnett | Aug. 4, 1959 |